Feb. 4, 1969 J. F. YURASEK ET AL 3,426,245

HIGH SPEED MAGNETIC DEFLECTION AMPLIFIER

Filed Nov. 1, 1967

INVENTORS
ABNER OWENS JR.
JOHN F. YURASEK
BY Herbert L. Davis
ATTORNEY

United States Patent Office 3,426,245
Patented Feb. 4, 1969

3,426,245
HIGH SPEED MAGNETIC DEFLECTION AMPLIFIER

John F. Yurasek, Oakland, and Abner Owens, Jr., Paramus, N.J., assignors to The Bendix Corporation, a corporation of Delaware Filed Nov. 1, 1967, Ser. No. 679,906
U.S. Cl. 315—27 12 Claims
Int. Cl. H01j 29/76

ABSTRACT OF THE DISCLOSURE

An amplifier network for electrical signals to be applied to a yoke deflection coil of a cathode ray tube with a resistor to sense current flow in the yoke deflection coil so as to feedback a voltage to the amplifier to stabilize energization of the yoke deflection coil. In the amplifier network an electrical signal from a signal source is applied to an input of a typical differential amplifier and the resultant output signal voltage from the differential amplifier applied through a cross-over distortion elimination stage to a driving stage that will amplify only positive components of the signal. The output of the driving stage is applied to one-half of a push-pull amplifier. Negative components of the differential amplifier output signal are applied, through a different path, to a driving stage and the output of that stage is applied to the other half of the push-pull amplifier. The two components of the signal are re-united at an output of the push-pull amplifier which in turn provides an energizing current to the yoke deflection coil in a cathode ray tube. The deflection of the electron beam in the cathode ray tube is a function of the current in the yoke deflection coil. The current sensing resistor is connected in series with the yoke deflection coil so that the current passing through the coil causes a voltage across the current sensing resistor which is picked off and fed back to the input of the differential amplifier. The feedback voltage is proportional to the current in the yoke deflection coil and as applied to the input of the differential amplifier serves to stabilize the yoke deflection coil current.

CROSS-REFERENCES TO RELATED APPLICATIONS

The present invention relates to a cathode ray tube such as that disclosed and claimed in a copending U.S. application Ser. No. 624,785 filed Mar. 21, 1967, by Francis Henry Sand Rossire and assigned to The Bendix Corporation, assignee of the present invention.

BACKGROUND OF THE INVENTION

*Field of the invention*

This invention relates to the amplification of signals to a yoke deflection coil in a cathode ray tube and to the sensing of current in the yoke deflection coil and relating that current to an input to the amplifier. More particularly, this invention relates to the application of signals to a typical differential amplifier from which the signals are applied to a cross-over distortion elimination stage, and in turn through a driving stage to a push-pull amplification stage and thereby to a yoke deflection coil with the current in the coil being stabilized by feeding back a voltage to the input of the differential amplifier that is proportional to the current in the yoke deflection coil.

*Description of the prior art*

Prior to the present invention, it has been common practice to use an amplifier having a push-pull transistor stage composed of two similar transistors such as two NPN transistors. The problems encountered here involved the high collector output impedance of one transistor and the low emitter impedance of the other transistor and there was a resultant mismatch of impedances due to the high impedance of one and the low impedance of the other transistor. To compensate for the mismatch of output impedances, a resistor of a high value was usually inserted in series with the emitter follower portion of the push-pull amplifier. This resistor served as a high impedance for matching the collector impedance of the other portion of the push-pull amplifier. The resistance was valid for a small range of operating conditions. The result was that if the operating conditions exceeded the range, the value of the resistance was no longer correct for impedance matching and a mismatch would then occur. Even when mismatch did not occur, the impedance was high since a match was made to the high impedance of the collector portion of the push-pull amplifier. In the present invention by using transistors of opposite conductive types, NPN and PNP, both stages of the push-pull amplifiers provide emitter followers having a low output impedance. Thus, no resistor is necessary and the impedances may be effectively matched for a greater range of operating conditions.

While a stabilized transistor signal amplifier circuit is disclosed in U.S. Patent No. 2,847,519, granted Aug. 12, 1958, to A. I. Aronson which utilized a matching arrangement of the respective transistors of both stages, there are other substantial differences between the present invention and the disclosure of the Aronson patent in that the Aronson amplifier uses a frequency stabilization feedback loop which does not suggest the voltage stabilization feedback loop of the present invention in that the arrangement in the present invention is such that the current passed through the yoke deflection coil and thus through the current sensing resistor is proportional to the applied voltage signal so as to provide a feedback voltage to effect stabilization of the energizing current applied to the yoke deflection coil which is not possible with the Aronson disclosure.

Furthermore, the present invention utilizes positive and negative signal component passing diodes instead of a resistor arrangement such as the resistor 61 of the Aronson patent. The diode stage thus utilized in the present invention serves to minimize attenuation of thus passed voltage signal components and eliminate or avoid the inherent crossover distortion that would otherwise be present in a mere resistor arrangement.

The present invention does not utilize any blocking capacitors such as the capacitor 72 of the Aronson patent. Instead the invention relates to the provision of a distinctly different idea of means for providing energizing current for effecting operation of a magnetic deflection coil of a cathode ray tube, whereas the disclosure of the Aronson patent relates to the use of alternating current voltages for operating a loudspeaker 75 and to a distinctly different mode of operation involving entirely different problems incident to the operation of a loudspeaker which is entirely incompatible with the provision of a highly stable ultralinear current for the operation of a yoke deflection coil of a cathode ray tube as in the present invention.

SUMMARY OF THE INVENTION

The present invention contemplates the provision of novel means for providing a highly stable ultralinear current to a yoke deflection coil of a cathode ray tube, together with means for sampling the current in the magnetic deflection coil and means for conveying the sampled information to the system.

An object of this invention is to provide novel signal amplification means for effecting a highly stable ultralinear current which is proportional to an input signal to a yoke deflection coil of a cathode ray tube.

Another object of this invention is to provide in the aforenoted means a low output impedance to the yoke deflection coil of the cathode ray tube.

Another object of this invention is to provide such a signal amplification means which permits the use of an unregulated power supply.

The foregoing and other objects and advantages of the invention will appear more fully hereinafter in consideration of the detailed description which follows and together with the accompanying drawings wherein one embodiment of the invention is illustrated. It is to be expressly understood, however, that the drawings are for illustration purposes only and are not to be construed as defined within the limits of the invention.

DESCRIPTION OF THE DRAWINGS

In the drawings in which corresponding numerals indicated corresponding parts in the respective views.

DESCRIPTION OF THE INVENTION

Figure 1:
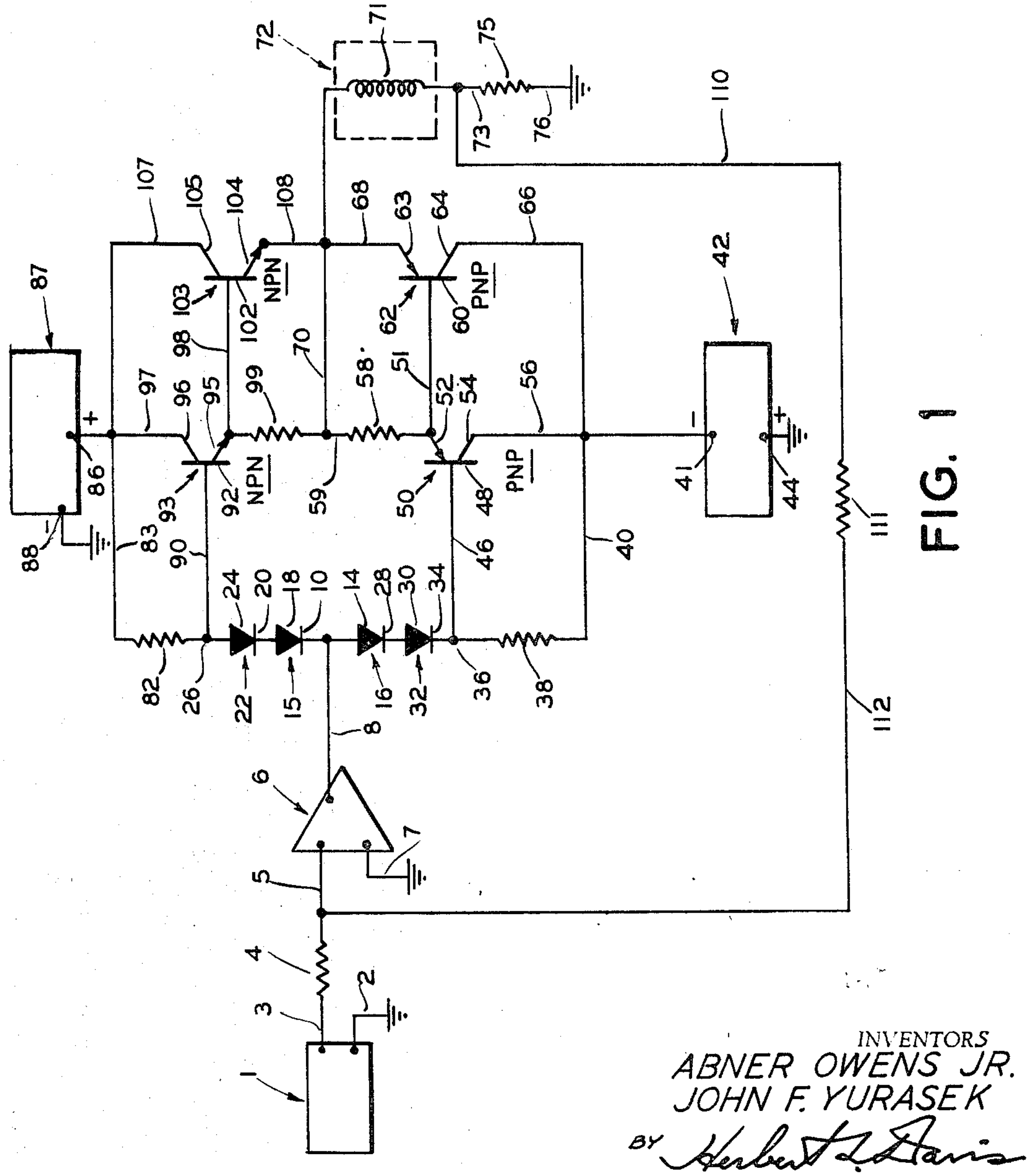
FIGURE 1 is a schematic wiring diagram of an amplifier network embodying the present invention and including a differential amplifier, a diode stage for passing positive and negative components of a signal voltage to a push-pull amplifier and thereby to a yoke deflection coil of a cathode ray tube and a current sensing resistor operably connected between the yoke deflection coil and across the input of the differential amplifier to provide a feedback voltage to the differential amplifier to effect a highly stable ultralinear current energization of the yoke deflection coil of the cathode ray tube.

Referring to FIGURE 1 of the drawings, there is indicated by the numeral 1 an electrical signal source which may be of a conventional type for supplying an alternating current signal of a variable amplitude and phase or the signal source 1 may be of a type supplying a variable amplitude direct current signal of a reversible selected polarity across output conductors 2 and 3. The signal source 1 has the output conductor 2 connected to ground and the opposite output conductor 3 leading through a resistor 4 and a conductor 5 to an input terminal of a differential amplifier 6 of a conventional type having a grounded input-output conductor 7.

The differential amplifier 6 output is connected to a conductor 8 which in turn is connected to a cathode 10 of a diode 15 and to an anode 14 of a diode 16.

The diode 15 has an anode 18 connected to a cathode 20 of a diode 22 which in turn has an anode 24 connected to a conductor 26, while the diode 16 has a cathode 28 connected to an anode 30 of a diode 32 which in turn has a cathode 34 connected to a conductor 36. The cathode 34 is in turn connected through a resistor 38 and a conductor 40 to a negative terminal 41 of a source of electrical energy 42 having a positive terminal 44 connected to ground.

A conductor 46 leads from the conductor 36 to a base 48 of a PNP type transistor 50 having an emitter 52 and a collector 54. The emitter 52 is connected to an output conductor 51 and is further connected through a resistor 58 and a conductor 59 to a conductor 70 leading to a yoke deflection coil 71. The collector 54 is connected to said negative terminal 41 of the source of electrical energy 42 through a conductor 56. The output at conductor 51 is applied to a base 60 of a second transistor 62 of a PNP type having an emitter 63 and a collecor 64.

The collector 64 is connected by a conductor 66 to said negative terminal 41 of the source of electrical energy 42 while the emitter 63 is in turn connected through a conductor 68 to a conductor 70 leading from the conductor 59 to one end of a yoke deflection coil 71 of a cathode ray tube 72 to control the energization thereof as hereinafter explained. The opposite end of the coil 71 is connected through a conductor 73 to an end of a current sensing resistor 75 having the opposite end connected to ground through a conductor 76 for a purpose to be explained hereinafter.

The conductor 26 is connected through a resistor 82 and a conductor 83 to a positive terminal 86 of a source of electrical energy 87 having a negative terminal 88 connected to ground. A conductor 90 leads from said conductor 26 to a base 92 of an NPN type transistor 93 having an emitter 95 and a collector 96. The collector 96 is connected to a conductor 97 which in turn is connected to the positive terminal 86 of the source of electrical energy 87.

The emitter 95 is connected to an output conductor 98 and also through a resistor 99 and the conductor 59 to the conductor 70 leading to the yoke deflection coil 71 serially connected through the sensing resistor 75 and the grounded conductor 76 to the ground input-output conductor 7 of the differential amplifier 6.

The conductor 98 is in turn connected to a base 102 of a second transistor 103 of an NPN type. The transistor 103 has an emitter 104 and a collector 105. The collector 105 is connected by a conductor 107 to the positive terminal 86 of the source of electrical energy 87 while the emitter 104 is in turn connected through a conductor 108 to the conductor 70 leading from the conductor 59 to the yoke deflection coil 71 of the cathode ray tube 72 to control the energization thereof, as hereinafter explained.

A conductor 110 leads from the conductor 73, connecting the yoke deflection coil 71 to the current sensing resistor 75, and is in turn connected through a resistor 111 and a conductor 112 to the input conductor 5 leading to the input of the differential amplifier 6 while the opposite end of the sensing resistor 75 is connected through the ground conductor 76 to the grounded input 7 of the differential amplifier 6 so that the voltage sensed across the sensing resistor 75 is proportional to the current flowing through the yoke deflection coil 71 and is applied to the input of the differential amplifier 6.

Figure 2:
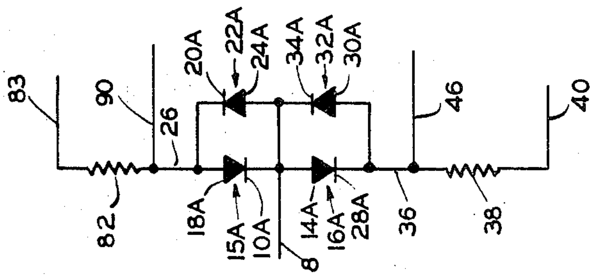
FIGURE 2 illustrated a fragmentary view of an alternate arrangement of the diode stage which may be applied to the amplifier network of FIGURE 1.

*Modified form of FIGURE 2*

In the modified form of the invention shown by the fragmentary network of FIGURE 2, there is provided an alternate arrangement of the diode stage in the form of a series-parallel combination of diodes 15A and 22A, and diodes 16A and 32A. In FIGURE 2, conductor 8 is connected to the cathode 10A of diode 15A and to an anode 24A of a diode 22A and to a cathode 34A of diode 32A and to an anode 14A of a diode 16A. In turn anode 18A of diode 15A and cathode 20A of diode 22A are connected to the conductor 26 while a cathode 28A of diode 16A and an anode 30A of the diode 32A are connected to the conductor 36 in a network which is otherwise the same as the network of FIGURE 1.

The arrangement of the diodes 15, 16, 22 and 32 in the diode stage of FIGURE 1 and the diode 15A, diode 16A, diode 22A and diode 32A in the diode stage of the network of FIGURE 2, operate to eliminate or avoid the cross-over distortion which might otherwise be caused by the PNP transistors 50 and 62 and NPN transistors 93 and 103 were a mere resistor provided in place of the diode stage, as hereinafter explained in greater detail.

OPERATION

*Amplifier network of FIGURE 1*

In the operation of the yoke deflection coil 71 of the cathode ray tube 72 by the amplifier network of FIGURE 1, as applied to an alternating current signal source 1, it will be seen that prior to the emission of the alternating current signal from the signal source 1, the quiescent condition for the amplifier is such that at the node of conductor 59 and conductor 70 there appears a zero voltage. However, as a result of voltages applied from the electrical energy sources 87 and 42 in the network of FIGURE 1 there will be a flow of current from the source 87 through resistor 82, diode 22, diode 15, diode 16, diode 32, and resistor 38 to the source 42, while the PNP transistor 50 and the PNP transistor 62 and the NPN transistor 93 and NPN transistor 103 will be non-conducting as a result of the respective positive and negative biasing voltages caused by the voltage drops across the resistors 38 and 82.

However upon an emission of an alternating current signal from the signal source 1 to the input conductor 5, the differential amplifier 6 amplifies that signal and applies at output conductor 8 an amplified alternating current of a wave form of opposite phase relation to that of the alternating current input signal.

The amplified alternating current at output conductor 8 is then applied to the cathode 10 of diode 15 and the anode 14 of diode 16 of the diode stage of FIGURE 1. Since diodes 15, 16, 22 and 32 are already conducting, the amplified output signal of the differential amplifier 6 will pass through these diodes and be applied through conductor 46 to the base of the PNP type transistor 50 and through conductor 90 to the base 92 of the NPN type transistor 93.

As the positive component of the output signal is applied to base 92 of NPN transistor 93, the conductivity of transistor 93 increases so that the amplified positive component of the signal appears at the emitter 95 output and is applied through conductor 98 to the base 102 of NPN transistor 103 while the current flowing through resistor 99 increases as a function of the increase in conductivity of transistor 93.

The positive component of the signal applied to base 102 of NPN transistor 103 then in turn increases the conductivity of transistor 103 causing an output voltage to appear at emitter 104 of transistor 103. While the positive component of the voltage was being developed between transistors 93 and 103, the current path for the source of electrical energy 87 has been altered so that current flowing from the positive terminal 86 of the source of electrical energy 87 proceeds through conductor 97, transistor 93, resistor 99 and through the yoke deflection coil 71 and the sensing resistor 75, establishing only a minute current leakage path for the transistor 93.

The major current path from terminal 86 of the electrical source of energy 87 exists through conductor 107 and transistor 103 to the yoke deflection coil 71 and the sensing resistor 75 to ground. The controlling current is flowing through conductor 98 from emitter 95 of the NPN transistor 93 to a base 102 of the NPN transistor 103.

Further the current flowing through resistor 38 creates the necesary positive biasing voltage for the base 48 to collector 54 circuitry to maintain the PNP transistor 50 non-conductive during the quiescent condition. However, upon the amplified alternating current output signal appearing at the conductor 8, the signal will also be transmitted through diode 16 and diode 32 of FIGURE 1 to the coductor 36 from which it is applied through conductor 46 to the base 48 of the PNP type transistor 50. During the positive component of the signal, the PNP type transistor 50 remains in its non-conductive quiescent condition, but during the negative component of the signal, the conductivity of the PNP type transistor 50 is increased as a function of the negative component of the signal.

Since the current flowing through resistor 58 increases as a function of the conductivity of transistor 50, the voltage at emitter 52 of transistor 50 increases, reproducing the negative component of this signal in an amplified form. The amplified negative component of this signal is applied through conductor 51 to the base 60 of the PNP type transistor 62 thereby increasing the conductivity of transistor 62 which increases the current flowing through transistor 62 and conductor 68. The increased current causes the amplified negative component to appear at the node formed by conductor 68, conductor 70, and conductor 108. The amplified negative component is applied through conductor 70 to the yoke deflection coil 71 of the cathode ray tube 72 and the sensing resistor 75. At this point both the positive component and the negative component of the amplified signal are re-united and applied as a push-pull signal from transistors 62 and 103 and applied to the yoke deflection coil 71 and therethrough to the sensing resistor 75 so as to cause current to flow in the yoke deflection coil 71 and the sensing resistor 75.

While the negative component of the signal was applied through transistors 50 and 62, the negative component of the amplified signal was also applied through diode 15 and diode 22 through conductor 90 to the base 92 of transistor 93. The negative component does not effect the quiescent condition of transistor 93 and hence does not effect the conductivity of transistor 103.

As a result a current path from ground through the yoke deflection coil 71 and sensing resistor 75 continues through the conductor 59 and resistor 58 to transistor 50 which in turn provides the path to collector 54 and conductor 56 to the negative terminal 41 of the source of electrical energy 42. Another current path from the yoke deflection coil 71 continues through conduotor 68, transistor 62, conductor 66 to the negative terminal 41 of the source of electrical energy 42, while conductor 51 was transmitting current between transistors 50 and 62. The current through the yoke deflection coil 71 and sensing resistor 75 will vary as a function of the push-pull voltage applied to them. The current through yoke deflection coil 71 creates a voltage across sensing resistor 75 which is applied through conductor 110 and resistor 111 to conductor 112 from which it is applied to the input conductor 5 to the differential amplifier 6 so that the input conductor 5 to the differential amplifier 6 experiences the difference between the input signal applied by signal source 1 through conductor 3 and resistor 4 and the feedback voltage applied through conductor 110, resistor 111 and conductor 112. Thus it is the difference between the two signals, since they are of opposite polarity, that is amplified by the differential amplifier 6.

Interpretation of the distortion compensation effect of the invention requires that the following voltages be defined as follows:

$v_s$=the instantaneous voltage emanating from signal source 1 as a function of time.

$v_{fn}$=the instantaneous voltage fed back in proportion to an undistorted voltage developed across sensing resistor 75 which is in direct proportion to yoke deflection coil 71 current as a function of time.

$v_{fd}$=the instantaneous voltage fed back in proportion to a distorted voltage developed across sensing resistor 75 which is in direct proportion to yoke deflection coil 71 current as a function of time.

$v_{on}$=the instantaneous output voltage applied to the yoke deflection coil 71 and sensing resistor 75, causing yoke deflection current to flow which would be the normal response to the signal voltage.

$v_{od}$=the instantaneous distorted output voltage which is applied to the yoke deflection coil 71 and sensing resistor 75, causing yoke deflection current to flow; and it is the algebraic sum of $v_{on}$ and the distortion effect.

$v_{ed}$=the instantaneous error voltage to differential amplifier 6 as the result of the algebraic summation of $v_s$ and $v_{fd}$.

$v_{en}$=the instantaneous error voltage applied to differential amplifier 6 as the result of the algebraic summation of $v_s$ and $v_{fn}$.

Since the distorted feedback voltage $v_{fd}$ or the normal feedback voltage $v_{fn}$ is of opposite polarity of signal $v_s$, the distorted error voltage $v_{ed}$ and the normal error voltage $v_{en}$ may be written as:

$$v_{ed}=v_s-v_{fd} \quad (1)$$
$$v_{en}=v_s-v_{fn} \quad (2)$$

The development of a complex waveshape, as a result of distortion occurring in the amplification of the signal being applied by the signal source 1, causes over voltages and under voltages, depending at what point in time the complex waveshape is viewed with respect to an undistorted response to the applied signal, being applied to the yoke deflection coil 71 and sensing resistor 75 so that at any point in time for an input signal to differential amplifier 6, the distorted output voltage $v_{od}$ may be greater than the normal response voltage $v_{on}$, equal to $v_{on}$, or less than $v_{on}$.

For the condition where the instantaneous distorted output voltage $v_{od}$ is greater than the instantaneous normal output voltage $v_{on}$, the distorted feedback voltage $v_{fd}$ will then be greater than a normal feedback voltage $v_{fn}$ since $v_{fd}$ is proportional to the distortion output voltage $v_{od}$. Referring to Equations 1 and 2, the error voltage as effected by distortion $v_{ed}$ will now be less than a normal error voltage $v_{en}$. Since $v_{ed}$ is less than $v_{en}$, the amplified voltage will be reduced thereby compensating for the distortion effect so that the normal response voltage $v_{on}$ is applied to the yoke deflection coil 71 and the sensing resistor 75. If the initial compensation is insufficient, the invention will continue to compensate tending to establish $v_{on}$.

For the condition where the distorted output voltage $v_{od}$ is equal to the normal output voltage $v_{on}$, the distorted feedback voltage $v_{fd}$ will be equal to the normal feedback voltage $v_{fn}$ resulting in the error voltage as effected by distortion $v_{ed}$ equalling the normal error voltage $v_{en}$. Since $v_{ed}$ equals $v_{en}$ no compensation takes place.

For the condition where the distorted output voltage $v_{od}$ is less than the normal response voltage $v_{on}$, the distorted feedback voltage $v_{fd}$ is less than the normal feedback voltage $v_{fn}$. As a result, the input voltage as effected by distortion $v_{ed}$ is greater than the normal error voltage $v_{en}$. Since the error voltage as effected by distortion $v_{ed}$ is greater than the normal error voltage $v_{en}$, the amplified voltage will be increased resulting in compensation for the distortion effect so that normal response voltage $v_{on}$ is applied causing current to flow in the yoke deflection coil 71 and the sensing resistor 75.

If the distortion results in a voltage that is at all times greater than the normal response voltage to a signal emanating from said signal source 1, then the operation would be the same as the operation for the instantaneous voltage at the time where the distorted output voltage $v_{od}$ is greater than the normal response voltage $v_{on}$.

If the distortion results in a voltage that is at all times smaller than the normal response voltage to a signal emanating from said signal source 1, then the operation would be the same as the operation for the instantaneous voltage at the time where the distorted output voltage $v_{od}$ is less than the normal response voltage $v_{on}$.

The diodes 16, 15, 22 and 32 in the network of FIGURE 1 are used to eliminate cross-over distortion and minimize attenuation of the output signal from the differential amplifier 6. The current flowing through the diodes, as a result of the diodes being a current path between the source of electrical energy 87 and the source of electrical energy 42 results in a relatively constant voltage being created across diodes 22, 15, 16 and 32 such that the voltage across diode 16 and diode 32 compensates for the voltage drop between emitter 52 and base 48 of transistor 50, and emitter 63 and base 60 of transistor 62.

A resistor will not suffice, since the voltage will vary as a function of the current and attenuate the applied signal. The function of the compensating voltage is necessary so that when a signal is applied to the diodes and transistor it does not have to overcome the voltage drop caused by the emitter-base junctions of transistors 50 and 62. The resulting output voltage appearing at conductor 68 has an immediate response to the signal applied to diodes 16 and 32 and transistors 50 and 62.

If the diodes were not present and a mere resistor were used, the signal would have to overcome the voltage drop caused by the emitter-base junctions of transistors 50 and 62. A delay in response would occur in the output voltage, appearing at conductor 68, until the signal overcomes the voltage drop at which point the output voltage will follow the signal attenuated by the emitter-base voltage drops in transistors 50 and 62. The same is true of diode 15 and diode 22 and transistors 93 and 103.

Thus in the event a mere resistor were used in place of the diodes, there would result an attenuation of the signal applied to the yoke deflection coil 71 and the energizing signal would not be sinusoidal for a sinusoidal voltage output at conductor 8. The wave shape would be separated into an attenuated positive component and an attenuated negative component with a time delay between components. The distortion of the signal in such an arrangement may be referred to as cross-over distortion. In distinction in the present invention the diodes 15, 16, 22 and 32 of FIGURE 1 are so selected in relation to the components of the network so as to in effect eliminate or avoid such cross-over distortion of the amplified signal wave.

*Operation of the diode stage of FIGURE 2 as applied to the network of FIGURE 1*

In the operation of the modified form of the diode stage of FIGURE 2, it will be seen that, as in the network of FIGURE 1, during the quiescent condition of the amplifier 6, there will be a flow of direct current from the source 87 through resistor 82, diode 15A, diode 16A and resistor 38 to the direct current source 42 so that due to the current flowing through the diodes 15A and 16A there will result a constant voltage drop across the diodes 15A and 16A which will tend to back bias the respective oppositely poled diodes 22A and 32A to a non-conductive state.

However upon an amplified alternating current signal being applied at the conductor 8, the positive portion of the alternating current signal wave will initially act through the conductively biased diode 15A. Depending then upon the amplitude of the positive portion of the signal wave, it will be seen that upon the positive going edge of the positive portion of the signal wave exceeding the biasing voltage of the source 87 applied to the diode 15A, the diode 22A will be then biased to a conductive state whereupon such positive portion of the signal wave will then pass through the oppositely poled diode 22A effecting a constant voltage drop across the diode 22A which will then act in a sense to back bias the diode 15A to a non-conductive state.

Thereafter upon the negative going edge of the positive portion of the signal wave decreasing in amplitude below the amplitude of the biasing voltage applied by the source 87 through the resistor 82 as the cross-over point of the signal wave is approached, the diode 22A will be biased to a non-conductive state while the diode 15A will be biased to the previous conductive state.

Due then to the action of the alternately operable diodes 15A and 22A, the effective positive bias applied to the base 92 of the NPN type transistor 93 can never exceed the biasing voltage provided by the source 87 which will in effect clamp the conductor 26 to the positive potential supplied by the source 87 due to the biasing of the base 92 and collector 96 of the transistor 93 which in turn will clamp the controlling output of the emitter 95 to the same source potential. It may be noted that the conductivity of the PNP type transistor 50 is unaffected by the positive portion of the signal wave since the PNP type transistor 50 is rendered fully non-conductive by a positive bias applied to the base 48 by the voltage drop across the resistor 38 resulting from the current flow from the source of biasing voltage 87 to the source 42.

Similarly upon the signal wave passing through the cross-over point, the negative portion of the alternating current signal wave will be initially applied through the conductively biased diode 16A. Then, depending upon the amplitude of the negative portion of the signal wave, upon the negative going edge of the negative portion of the signal wave exceeding the back bias applied to the diode 32A by the voltage drop across the diode 16A, the diode 32A will be then biased to a conductive state whereupon such negative portion of the signal wave will then be applied through the oppositely poled diode 32A effecting a constant voltage drop across the diode 32A which will then act in a sense to back bias the diode 16A to a non-conductive state.

Thereafter, upon the positive going edge of the negative portion of the signal wave decreasing in amplitude below the amplitude of the biasing voltage applied by the sources 87 and 42 through the resistors 82 and 38, as the cross-over point of the signal wave is approached the diode 32A will be biased to a non-conductive state while the diode 16 will be biased to the previous conductive state.

Due then to the action of the alternately operable diodes 16A and 32A, the effective negative bias applied to the base 48 of the PNP type transistor 50 can never exceed the negative biasing voltage provided by the source 42 which will in effect clamp the conductor 36 to the negative potential supplied by the source 42 due to the biasing of the base 48 and collector 54 of the transistor 50 which in turn will clamp the controlling output of the emitter 52 to the same source potential. The conductivity of the NPN type transistor 93 is unaffected by the negative portion of the signal wave, since the NPN type transistor 93 is rendered fully non-conductive by a negative bias applied to the base 92 by the voltage drop across the resistor 82 resulting from the current flowing from the source of biasing voltage 87 to the source 42.

The diodes 22A and 32A thus provide a positive means for limiting the effect of the input voltage excursion at conductor 8 on the output 70 to the maximums provided by the biasing sources 42 and 87.

The diodes 15A and 16A are so selected in relation to the components of the network as to in effect eliminate or avoid the heretofore referred to cross-over distortion of the amplified signal wave.

While the operation of the amplifier networks of FIGURES 1 and 2 have been explained with reference to a source 1 of an alternating current signal of a variable amplitude and phase, it will be readily seen that the amplifier networks of FIGURES 1 and 2 are equally applicable to a source 1 of a direct current signal of a variable amplitude and a direct current signal which may have either a positive or a negative polarity applied at the output conductor 3 dependent upon the selected output signal.

While two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a signal amplifier of a type including a first transistor of one conductivity type having base, emitter and collector electrodes, a second transistor of an opposite conductivity type having base, emitter and collector electrodes, and means for applying an input signal having positive and negative electrical components to the base electrodes of the first and second transistors; the improvement in which said last mentioned means includes unidirectional current flow control means, means for biasing the base electrodes of the first and second transistors to a condition normally non-conductive of electrical energy between the other electrodes thereof, said biasing means effecting flow of electrical energy through said unidirectional current flow control means in one sense, said input signal applying means including a first control means for effectively applying therethrough in a sense opposite to said one sense the negative component of the input signal to the base electrode of the first transistor so as to bias the base electrode of the first transistor in a sense conductive of electrical energy between the other of the electrodes of the first transistor, and said input signal applying means including a second control means for effectively applying therethrough in a sense opposite to said one sense the positive component of the input signal to the base electrode of the second transistor so as to render the second transistor conductive of electrical energy between the other of the electrodes of the second transistor, and means for applying an electrical output signal in response to the conductivity of the first and second transistors.

2. The improvement defined by claim 1 in which the unidirectional current flow control means includes serially connected diodes.

3. The improvement defined by claim 2 in which the first control means includes at least one of the serially connected diodes, and the second control means includes at least another of the serially connected diodes, and the input signal applying means includes an input conductor connected between said one and said other serially connected diodes.

4. The improvement defined by claim 2 including oppositely poled diodes connected in a series-parallel relation to the serially connected diodes of the unidirectional flow control means, and the input signal applying means includes an input conductor connected between said one and said other serially connected diodes and said oppositely poled diodes.

5. The improvement defined by claim 4 in which said first and second control means each includes at least one of said serially connected diodes of the unidirectional current flow control means, said oppositely poled diodes limiting the effect of the first and second control means, one of said oppositely poled diodes connected in the series-parallel relation to said one serially connected diode, and another of said oppositely poled diodes connected in the series-parallel relation to said other of the serially connected diodes.

6. The improvement defined by claim 1 in which the means for applying the input signal includes a differential amplifier for applying the input signal between the first and second control means, the means for applying an electrical output signal includes a push-pull amplifier responsive to the conductivity of the first and second transistors for applying an amplified electrical output signal current, a yoke deflection coil of a cathode ray tube connected to an output of the push-pull amplifier for energization by the amplified output signal current, and means for sampling the energizing signal current to provide a feedback voltage to the differential amplifier for stabilizing the input signal applied between the first and second control means.

7. The improvement defined by claim 6 in which the means for sampling the energizing signal current includes a sensing resistor connected between an output of the signal amplifier and the yoke deflection coil and across an electrical signal input to the differential amplifier for stabilizing the input signal applied between the first and second control means.

8. The improvement defined by claim 7 in which the unidirectional current flow control means includes serially connected diodes.

9. The improvement defined by claim 8 in which the first control means includes at least one of the serially connected diodes, and the second control means includes at least another of the serially connected diodes, and the input signal applying means includes an input conductor connected between said one and said other serially connected diodes.

10. The improvement defined by claim 9 including oppositely poled diodes connected in a series-parallel relation to the serially connected diodes of the unidirectional flow control means for limiting the effect of said one and said other serially connected diodes, and the input signal applying means includes an input conductor connected between said one and said other serially connected diodes and said oppositely poled diodes.

11. A signal amplifier network for supplying energizing current to a yoke deflection coil of a cathode ray tube; said amplifier network comprising:

a cross-over distortion elimination stage including a plurality of serially connected diodes and resistors;

a first and a second source of biasing voltage serially connected across the serially connected diodes and resistors for effecting a unidirectional flow of current therethrough;

one of the resistors being connected between a positive terminal of the first source and an anode of one of said serially connected diodes and another of said resistors being connected between a cathode of another of said serially connected diodes and a negative terminal of said second source;

a driver stage including a first transistor of one conductivity type having base, emitter and collector electrodes, and a second transistor of an opposite conductivity type having base, emitter and collector electrodes;

the base and collector electrodes of the first transistor being connected across one of said resistors and the base and collector electrodes of the second transistor being connected across the other of said resistors so that the first and second sources bias said first and second transistors respectively to a normally nonconductive state between the base and collector electrodes thereof;

means for supplying an electrical signal having negative and positive components;

a differential amplifier having a pair of input conductors connected to said signal supplying means and a pair of output conductors, one of said output conductors of the differential amplifier being connected between the cathode of said one diode and the anode of said other diode, means connecting another of said output conductors of the differential amplifier to a negative terminal of the first source and to a positive terminal of the second source so that the bias applied to the base electrodes of said first and second transistors by said first and second sources respectively may be selectively varied dependent upon the effective component of an electrical signal applied at the output conductors of said differential amplifier;

an output stage including a third transistor of one conductivity type and a fourth transistor of an opposite conductivity type, each having base, emitter and collector electrodes;

means for deriving a push-pull signal from the emitter electrodes of the first and second transistors of the driver stage and applying said push-pull signals to base electrodes of said third and fourth transistors;

means for applying an output signal from the emitter electrodes of the third and fourth transistors to a terminal of a yoke deflection coil, and means connecting an opposite terminal of the yoke deflection coil to the negative terminal of the first source and to the positive terminal of the second source for supplying an energizing current to the coil corresponding to the last mentioned output signal;

means for sampling the energizing current flowing to the yoke deflection coil so as to effect a feedback voltage signal, and means connecting the sampling means across the input conductors of the differential amplifier so as to apply the feedback voltage signals in opposing relation to the electrical signal applied to the input conductors of the differential amplifier by the electrical signal supplying means and thereby provide a differential electrical resultant signal transmitted from the output of the differential amplifier and through the amplifier network to the driving stage and the push-pull stage so as to stabilize the output signal applied to the yoke deflection coil.

12. The combination defined by claim 11 including oppositely poled diodes connected in a series-parallel relation to the serially connected diodes of the cross-over distortion elimination stage so as to limit the effect of the serially connected diodes upon an effective component of the resultant electrical signal applied at the output conductors of said differential amplifier exceeding in amplitude an opposing biasing voltage applied by one of said sources.

References Cited

UNITED STATES PATENTS

| | | | |
|---|---|---|---|
| 2,964,673 | 12/1960 | Stanley | 315—27 |
| 3,311,751 | 3/1967 | Maestre | 307—228 |
| 3,375,455 | 3/1968 | Motta | 330—17 |

RODNEY D. BENNETT, *Primary Examiner.*

J. G. BAXTER, *Assistant Examiner.*

U.S. Cl. X.R.

307—288, 313; 330—17, 22